United States Patent [19]
McVey

[11] 3,848,151
[45] Nov. 12, 1974

[54] CERAMIC ENVELOPE LAMP HAVING METAL FOIL INLEADS

[75] Inventor: Charles I. McVey, Shaker Heights, Ohio

[73] Assignee: General Electric Company, Schenectady, N.Y.

[22] Filed: Oct. 23, 1973

[21] Appl. No.: 408,523

[52] U.S. Cl. ................. 313/217, 313/198, 313/220, 313/221, 313/229, 313/243
[51] Int. Cl. ........................................... H01j 61/36
[58] Field of Search ............ 313/198, 217, 220, 221

[56] References Cited
UNITED STATES PATENTS
3,363,134   1/1968   Johnson .............................. 313/220

Primary Examiner—Herman Karl Saalbach
Assistant Examiner—Darwin R. Hostetter
Attorney, Agent, or Firm—Ernest W. Legree; Lawrence R. Kempton; Frank L. Neuhauser

[57] ABSTRACT

An electric lamp comprising an alumina ceramic tube having its ends closed by ceramic plugs. The plugs are sealed in place by fused sealing material and thin foils of a metal non-reactive with the lamp filling are embedded in the sealing material to serve as inleads. The foils may be made of molybdenum or other metal having a coefficient of expansion appreciably different from that of polycrystalline alumina and are thin enough to deform without rupturing or shaling of the sealing material through the temperature range of interest.

10 Claims, 5 Drawing Figures

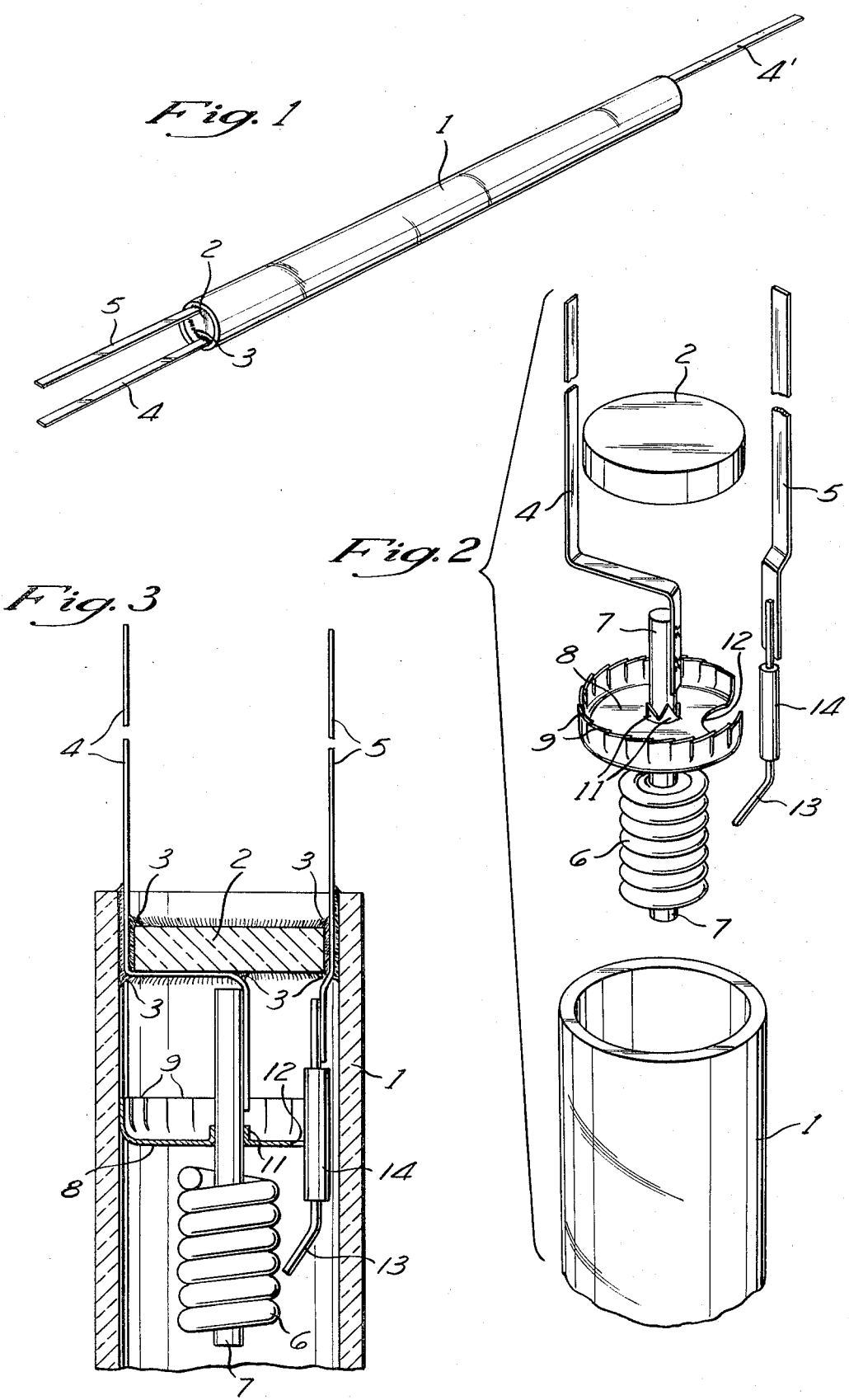

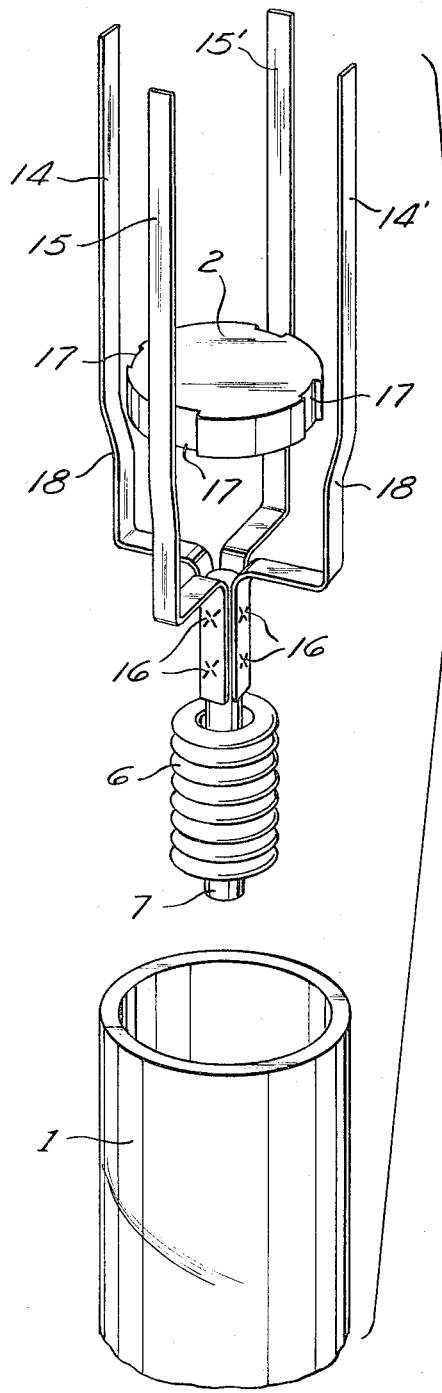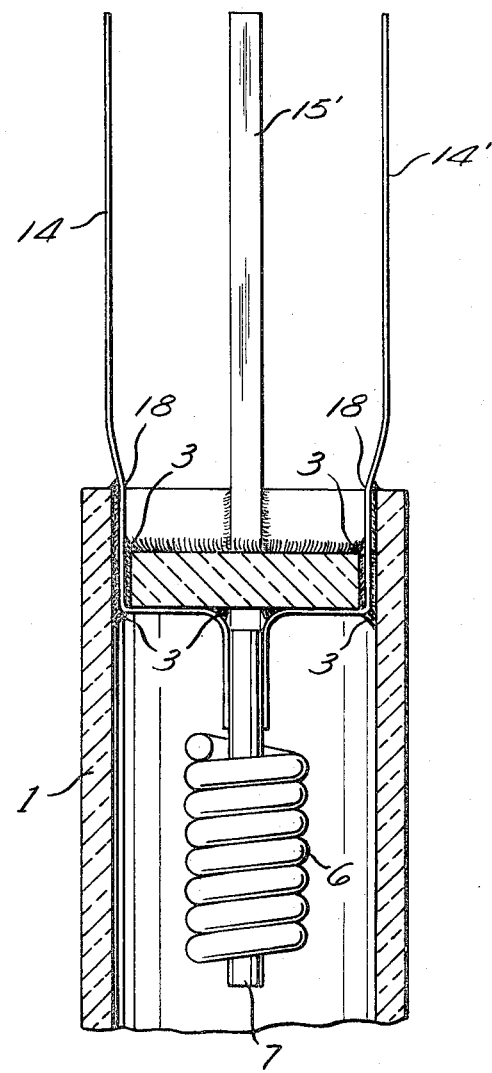
Fig. 4
Fig. 5

3,848,151

CERAMIC ENVELOPE LAMP HAVING METAL FOIL INLEADS

BACKGROUND OF THE INVENTION

1. Field of the Invention

The invention relates generally to ceramic electric lamps requiring seals to metal conductors, and more particularly to metal vapor arc lamps of this kind utilizing arc tubes of crystalline alumina ceramic.

2. Description of Prior Art:

In the development of improved lamps, the desire for lamp envelopes capable of withstanding higher operating temperatures, of the order of 1000 20 C and higher, has led to the development of improved ceramic structures made for instance of crystalline alumina. The term crystalline alumina as used herein is intended to include single crystal alumina such as sapphire, polycrystalline allumina such as disclosed in U. S. Pat. No. 3,026,210 — Coble, and longitudinally aligned crystalline alumina sometimes referred to as synthetic sapphire.

Such crystalline alumina envelopes have highly desirable characteristics but, unlike glass and quartz, the ceramic material is not thermally malleable. Accordingly, the familiar pinch type seals wherein inleads in the form of wires, ribbons, or other metallic bodies pass through the material which is folded down and compressed about them in a hermetic enclosure, cannot be made. To make ceramic electric lamps generally a cylindrical tube of the ceramic is used, metallic caps are affixed and sealed to the ends as disclosed in U.S. Pat. No. 3,243,635 —Louden et al., and the electrodes are supported from the end caps which serve simultaneously as terminals. Alternatively, discs or plugs of similar crystalline material may be affixed to the ends of the arc tube as disclosed in U. S. Pat. No. 3,363,134 —Johnson, and metal inleads may be sealed through apertures in the disc by a sealing glass material or frit.

Crystalline alumina envelopes as known up to the present utilizing the above-described end seals have serious limitations. For the end cap or the inlead, a metal must be used having a coefficient of thermal linear expansion which is a reasonably close match to that of alumina which is of the order of $8 \times 10^{116\ 6}$ per °C. The most practicable metal which meets this requirement is niobium. Unfortunately, niobium is permeable to oxygen and if the environment surrounding the arc tubes contains oxygen, it may permeate the niobium and enter the arc tubes where it causes rapid failure. In practice, the arc tube is enclosed within a vitreous outer envelope or jacket from which oxygen is removed by the use of getters, but this is a limitation upon the use of such ceramic lamp envelopes.

In the metal halide arc lamp which has to an appreciable extent replaced the high pressure mercury vapor lamp, the fill comprises mercury and one or more metal halides. One commercially available lamp has a filling of mercury and the iodides of sodium, thallium and indium, while another uses mercury and the iodides of sodium, scandium and thorium. These lamps use quartz as the material of the arc tubes. Quartz softens at a temperature of about 1400°C. and for a reasonably long life, the arc tubes are limited to maximum operating temperatures from 1,000° to 1,100°C. This temperature ceiling limits the efficacy and color rendition which can be achieved with these lamps. By going to arc tube envelopes or crystalline alumina which does not begin to soften or break down until about 1,600°C., higher efficiency and better color rendition would be obtained. Unfortunately, the halogen which is included as part of the metal halide filling in such lamps tends to react adversely with the niobium when it is used for the metal end caps or inleads and the lamps are shortly rendered inoperative.

SUMMARY OF THE INVENTION

The object of the invention is to provide improved seals for crystalline alumina lamp envelopes or arc tubes which avoid the need to use a metal such as niobium having substantially the same coefficient of expansion as crystalline alumina for the end caps or inleads. The desired seal structure permits the use of other metals for the inleads which are not permeable to oxygen or which do not react adversely with halogens included in the lamp fill.

According to the present invention, I provide electric lamp envelopes fabricated from crystalline alumina ceramic tubes closed by ceramic end or closure pieces, plugs or caps of the same or similar ceramic material appropriately sealed by a high temperature sealing material. Conductors in the form of thin foils, or in certain cases in the form of fine wires extend through narrow apertures next to the closure pieces, as between the tube wall and the plug, and are hermetically sealed in the sealing material. The conductors may be made of tantalum, molybdenum, tungsten or other metal having a coefficient of expansion appreciably different from that of crystalline alumina. The foils are thin enough or the wires are fine enough so that after bonding to the sealing material, they deform without rupturing and without shaling of the sealing material through the temperature range of interest, that is from rest temperature up to operating temperature.

In envelopes intended as arc tubes wherein relatively heavy electrodes must be supported in the ends, an electrode supporter may be mounted within the arc tube to provide mechanical support to the electrode. Alternatively, a plurality of inleads may be sealed into the end which together provide sufficient stiffness to support the electrode to which they are attached. A plurality of inleads may also be connected in parallel to share the current load in larger sizes of lamps as in high current metal halide lamps. In such cases the inlead may be circumferentially spaced about the seal plug to distribute the thermal and mechanical stress loading.

DESCRIPTION OF THE DRAWINGS

FIG. 1 is a pictorial view of a crystalline alumina arc tube having foil inleads sealed according to the invention.

FIG. 2 is an exploded pictorial view of the seal, foil inleads and electrode assembly at one end of the lamp.

FIG. 3 is a cross sectional view through the same end of the lamp as in FIG. 2.

FIG. 4 is an exploded pictorial view of the seal, foil inleads and single electrode assembly in a modified construction representing a variant of the invention.

FIG. 5 is a cross sectional view through the completed assembly represented in FIG. 4.

DETAILED DESCRIPTION

Referring to FIG. 1, the illustrated lamp or arc tube comprises a piece of ceramic tubing 1 of sintered translucent polycrystalline alumina or alternatively of longitudinally aligned crystalline alumina. Disposed at either end of the crystalline alumina tubing 1 are end plugs 2 sealed to the tubing with fused sealing material 3. A pair of foil inleads 4, 5 are shown projecting out of one end of the tube while a single foil inleads 4' projects from the other end. The arc tube contains a light-emitting filling. In the case of a high pressure sodium vapor lamp, the fill comprises sodium, mercury and an inert starting gas in accordance with U.S. Pat. No. 3,248,590 —Schmidt. In the case of a metal halide lamp, the arc tube may contain a fill comprising mercury, an inert gas and one or more metal halides in accordance with U.S. Pat. No. 3,234,421 —Reiling. The metal halide used is ordinarily the iodide of a light-emitting metal of which the preferred ones are sodium, scandium, thallium, indium, gallium and the rare earth metals.

In a ceramic metal halide discharge lamp, it is necessary to use inleads of refractory metal nonreactive with the halogen of the fill. Referring to FIGS. 2 and 3, the leads 4, 5 are located in the space between ceramic end plug 2 and the inside surface of ceramic tube 1 and are embedded in the sealing material. Preferably the inlead material should have a coefficient of thermal expansion less than that of the ceramic, or that of the fused sealing material which is similar in expansion characteristics to the ceramic. This means that the ceramic and the fused sealing material contract more than the metal foil in cooling from the sealing temperature, and insures that the interface bond between the inlead and the sealing material remains under compression at all times. Suitable nonreactive inlead metals are tantalum, molybdenum, rhenium, tungsten and alloys thereof, the first two being preferred on account of their greater malleability.

The difference in thermal expansion between the metal inlead and the alumina ceramic may be appreciable. For instance the coefficient of thermal expansion of molybdenum is $6.5 \times 10^{-6}$ per °C. by contrast with $8.0 \times 10^{-6}$ per °C. for alumina. In order to accommodate such differences, I have found it desirable to reduce the inlead cross section to the amount that will just suffice in the conduction of the required electrical energy with little self-heating due to ohmic dissipation. It is also desirable to maximize the bonding surface between the inlead and the sealing material, and for this purpose I use a flattened wire ribbon in which the width of the ribbon is large compared to its thickness. The shape of the edge of the ribbon should be controlled to avoid abrupt geometrical transitions which might create bond disruptive stresses. A feathered edge is accordingly desirable and this may be accomplished by selective etching or by rolling, hammering or beating techniques. Where the required current delivery is quite small or transitory as in the case of an auxiliary starting electrode, a very small diameter round wire may be sealed in without flattening.

As illustrated in FIG. 3, the ceramic end plug 2 may be located at some penetration within the end of the arc tube in order to provide a holding location for the sealing material indicated by the filleting at 3. The end cavity beyond the plug also provides a convenient location for engagement of the arc tube by a support frame for mounting within an outer protective envelope. By increasing the depth at which the end plug is sealed into the tubing, a lower temperature may be achieved at the end of the tubing which permits the use of lower cost less refractory materials than would otherwise be required as a support frame for mounting the arc tube. Recessing the plug also serves to reduce the stress at the sealing surface, in similar fashion to the effect of back-up rings of tubing.

The plug 2 may be made of the same translucent polycrystalline alumina ceramic as the tubing 1. Alternatively it may be made of alumina ceramic not having the same degree of light transmittance, or of different ceramic material providing it has substantially the same coefficient of thermal expansion as the ceramic used for the arc tube. As a variant to the disk-like plug illustrated, the plug may consist of two semi-circular parts and the foil passed between the two parts. An external alumina cap may also be used in lieu of a plug and the foil passed between the faying surfaces of cap and tube.

The thermionic self-heating electrodes generally used in arc discharge lamps are metal structures comprising one or more layers 6 of tungsten wire wound around the distal end of tungsten shank 7 with electron-emitting material enclosed in the interstices between turns. Such an electrode is relatively heavy and it is necessary to provide additional support over and above foil inlead 4 to hold it in place. To this end, the shank 7 extends through a square nail hole aperture in a pan-like electrode supporter 8. Supporter 8 may consist of thin molybdenum foil, for instance 1 mil thick, having a rolled serrated edge wall 9 which resiliently engages the inside surface of the ceramic tube 1. The ears 11 formed out of the nail hole are spot-welded to the shank 7 to provide support and foil 4 is likewise spot-welded to the shank beyond the supporter. A cut-out 12 in one side of the supporter provides a passageway through which extends auxiliary starting electrode 13. The auxiliary electrode may be a short length of tungsten wire welded to the inner end of foil inlead 5. To avoid the need for a large gap between the auxiliary electrode and the supporter at the cut out, an insulating ceramic sheath 14 may be placed around the auxiliary electrode wire.

FIGS. 4 and 5 illustrate another foil inlead electrode assembly embodying the invention. Two pairs of foils 14, 14' and 15, 15' are provided which straddle end plug 2 on diametrically opposite sides. The axially retroverted ends of the foils are spot-welded as indicated at 16 to the proximate end of electrode shank 7. With this construction, the electrode is adequately supported and electrode supporter 8 may be dispensed with. The two pairs of foils together may provide four times the current carrying capacity of the single foil 4 utilized in the constructions of FIGS. 2 and 3. Where the current carrying requirement is less, a single pair of foils such as 14, 14' may suffice. For larger diameter envelopes or higher current lamps, additional foil inleads may be circumferentially spaced about seal plug 2 to distribute the electrical and mechanical loading.

I have found it convenient to pass the inlead foil or foils through the clearance gap between the end plug and the tube wall. Observing presently practical tolerances in the manufacture of crystalline alumina ceramic parts, there is normally enough clearance for the purpose. However should tighter manufacturing tolerances be used, it may be desirable to provide shallow notched sectors 117 in the edge of seal plug 2. These notches accommodate the foil seals along with sufficient sealing material to wet both sides and provide a bond. The slight outward bends at 18 in the foils 14, 15 engage the side of tube 1 and support the assembly in place during the sealing operation.

The choice of sealing composition, sometimes referred to as sealing glass, used with a given lamp must be one that does not react adversely with the lamp fill. I have successfully used a composition designated G-54 consisting by weight of approximately 54.0 percent $Al_2O_3$, 38.5 percent CaO, and 7.5 percent MgO. Other compositions which may be used are those described in U.S. Pat. No. 3,281,309 — Ross, 3,441 421 — Sarver et al., and my own 3,588,577. With the G-54 sealing composition, the seals were made at a temperature of 1500°C. in a vacuum and the hermetic quality was confirmed by a helium leak detector. No problems with seal wetting were observed and the molten glassy seal material was observed to wet and flow by capillary action completely over and around the metal foil surface in the close space between the ceramic end plug and the tube wall. The interstices were filled with sealing material and the edges of the end plug and of the foils were filleted with the material.

In the drawings, the foils have been illustrated without tapering or feathering of the edges. Also the clearances between the end plugs and the tubing wall and the amount of sealing material have been exaggerated for clarity.

By way of examples of the invention, a number of ceramic envelopes were made utilizing polycrystalline alumina tubing about 110 millimeters long having a bore of 7.26 millimeters and a wall thickness of 0.75 millimeters and corresponding in size to that used for 400 watt high pressure sodium vapor lamps. The disc diameter as illustrated in FIGS. 2 and 3 was 6.86 millimeters so that the gap, assuming radial symmetry, was 0.2 mm. For tantalum foil seals, tantalum wire 0.8 mm. in diameter was rolled to ribbon having a width of 2.4 mm. and a thickness of 0.07 mm. The sealed length was about 3 millimeters, and assuming an electrical resistivity at 900°C. of $54 \times 10^{-6}$ ohm-cm., the seal resistance was 0.0096 ohm and the ohmic loss at 5 amperes current was 0.24 watts. Seals were also made using molybdenum foil 2.5 mm. wide by 0.02 mm. thick. The foil may be etched to taper the edge but hermetic seals were made even using foil in the unetched condition. For the same seal length and assuming an electrical resistivity at 900°C. of $21.8 \times 10^{-6}$ ohm-cm., the seal resistance was 0.0126 ohm and the ohmic loss at 5 amperes of current was 0.315 watt.

What I claim as new and desire to secure by letters Patent of the United States is:

1. An electric discharge lamp comprising:
   an envelope formed of crystalline alumina ceramic tubing;
   ceramic closure pieces at the ends of the tubing sealed in place by a fused sealing material;
   a light-emitting filling within said envelope and electrodes in the ends thereof;
   and inleads connected to said electrodes and comprising thin metal foils extending through narrow apertures next to the ceramic closure pieces, said foils being wetted by and embedded in said sealing material.

2. A lamp as in claim 1 wherein the foil inlead extends between the ceramic closure piece and the wall of the ceramic tubing.

3. A lamp as in claim 1 wherein the closure piece is a ceramic plug sealed in place within the end of the ceramic tubing, and the foil inlead extends between the plug and the wall of the ceramic tubing.

4. An electric discharge lamp as in claim 1 wherein a metal foil supporter for said electrode is included in said envelope close to said ceramic closure piece, said supporter being pan-like in form and having an edge wall which resiliently engages the wall of the ceramic tubing, said electrode being fastened to said supporter and supported thereby.

5. An electric discharge lamp as in claim 1 wherein a plurality of metal foils circumferentially spaced around the closure pieces are sealed into each end of the envelope and have axially retroverted inner ends to which the electrodes are attached.

6. An electric discharge lamp comprising:
   an envelope formed of crystalline alumina ceramic tubing;
   ceramic plugs closing the ends of the tubing and sealed in place by a fused sealing material;
   1 a light-emitting filling within said envelope;
   electrodes comprising a metal structure at the distal end of a tungsten shank located in the ends of said envelope;
   and inleads comprising thin metal foils extending through narrow apertures between the ceramic plugs and the wall of the ceramic tubing, said foils being wetted by and embedded in said sealing material, the inner ends of said foils being attached to the proximate ends of said shanks.

7. An electric discharge lamp as in claim 6 wherein a metal foil supporter for said electrode is located within said envelope close to said ceramic plug, said supporter being pan-like in form and having an edge wall which resiliently engages the wall of the ceramic tubing, said electrodes shank passing through an aperture is said supporter and being fastened thereto.

8. An electric lamp as in claim 7 including at one end an additional metal foil having an auxiliary starting electrode attached thereto and extending through an opening in said electrode supporter.

9. An electric discharge lamp as in claim 6 wherein a plurality of metal foils circumferentially spaced around the ceramic plugs are sealed into each end of the envelope and have axially retroverted inner ends to which the proximate ends of the electrode shanks are attached.

10. An electric discharge lamp as in claim 6 wherein the ceramic plugs have shallow notched sectors accommodating the inlead foils.

* * * * *